United States Patent
Salamanca Segoviano et al.

(10) Patent No.: US 7,477,506 B2
(45) Date of Patent: Jan. 13, 2009

(54) ELECTRICITY SUBSTATION

(75) Inventors: Francisco José Salamanca Segoviano, Madrid (ES); Cristina Martínez Vidal, Madrid (ES)

(73) Assignee: Red Electrica De Espana, S.A., Madrid (ES)

(*) Notice: Subject to any disclaimer, the term of this patent is extended or adjusted under 35 U.S.C. 154(b) by 395 days.

(21) Appl. No.: 11/293,882

(22) Filed: Dec. 2, 2005

(65) Prior Publication Data
US 2006/0187598 A1 Aug. 24, 2006

Related U.S. Application Data

(63) Continuation of application No. PCT/ES2004/000137, filed on Mar. 26, 2004.

(30) Foreign Application Priority Data
Jun. 3, 2003 (ES) .............................. 200301322
Oct. 28, 2003 (ES) .............................. 200302517

(51) Int. Cl.
*H02B 5/00* (2006.01)
(52) U.S. Cl. ..................... 361/602; 361/603; 361/604
(58) Field of Classification Search ......... 361/601–605, 361/611–612, 618–621
See application file for complete search history.

(56) References Cited

U.S. PATENT DOCUMENTS

| | | | | |
|---|---|---|---|---|
| 3,302,069 A | * | 1/1967 | Wilcox | 361/611 |
| 4,247,787 A | * | 1/1981 | Page | 307/112 |
| 4,342,067 A | * | 7/1982 | Thuries et al. | 361/602 |
| 4,467,220 A | * | 8/1984 | Page | 307/19 |
| 4,503,481 A | * | 3/1985 | Fujiya et al. | 361/612 |
| 5,589,674 A | | 12/1996 | Berger et al. | |
| 5,991,148 A | | 11/1999 | Heil et al. | |
| 6,134,101 A | * | 10/2000 | Bucher et al. | 361/612 |
| 6,556,428 B1 | * | 4/2003 | Takahoshi et al. | 361/619 |
| 6,560,091 B1 | * | 5/2003 | Takahoshi et al. | 361/604 |
| 7,075,778 B2 | * | 7/2006 | Abe | 361/602 |
| 2004/0027791 A1 | | 2/2004 | Marmonier et al. | |
| 2004/0037025 A1 | | 2/2004 | Abe | |

\* cited by examiner

*Primary Examiner*—Jayprakash N Gandhi
*Assistant Examiner*—Robert J Hoffberg
(74) *Attorney, Agent, or Firm*—Klauber & Jackson LLC

(57) ABSTRACT

The invention relates to an electrical substation. The inventive substation is characterised in that it consists of a special ring-type electrical configuration, known as a network ring, comprising SF6-insulated armoured modules M by way of a high-voltage switchgear. According to the invention, the modules are disposed such as to form longitudinally-linked squares, with a segregated phase arrangement. Owing to the ring configuration A, the use of armoured modules M and the segregated phase arrangement, it is possible to produce standardised base elements which are tested before being moved to the site of the substation in order to be connected to other elements and/or existing equipment with the same configuration or another standard configuration. In this way, a substation can be mounted and enlarged without the need for discharges or service interruptions and with a minimum loss of time in terms of mounting, repair and enlarging operations.

16 Claims, 19 Drawing Sheets

PRIOR ART

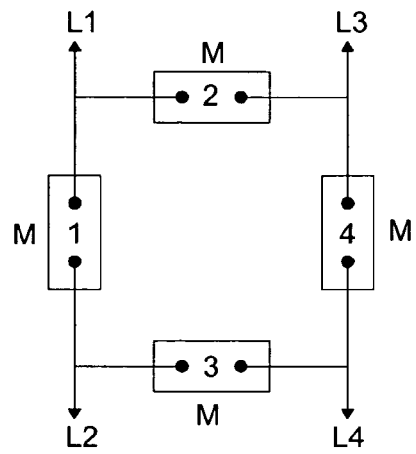
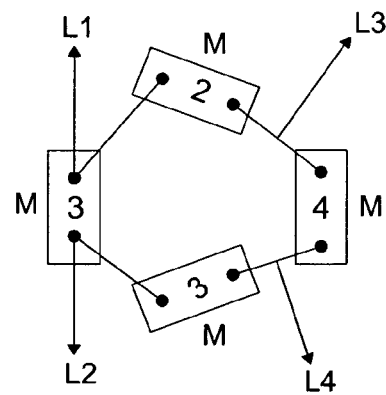
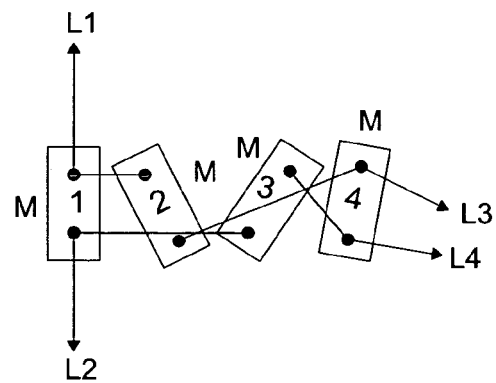
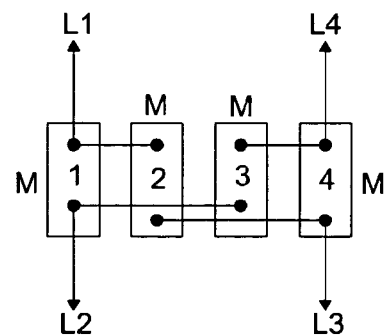
FIG.13

ELECTRICITY SUBSTATION

RELATED APPLICATIONS

The present application is a Continuation of co-pending PCT Application No. PCT/ES2004/000137, filed Mar. 26, 2004, which in turn, claims priority from Spanish Application Serial No. P200301322, filed Jun. 3, 2003 and Serial No. P200302517, filed Oct. 28, 2003. Applicants claim the benefits of 35 U.S.C. §120 as to the PCT application and priority under 35 U.S.C. §119 as to said Spanish applications, and the entire disclosures of the applications are incorporated herein by reference in their entireties.

OBJECT OF THE INVENTION

The present invention refers to an electrical substation, which presents a series of particularities that affect both the electrical configuration and the physical location of its equipment and even the electrical insulation technology used for the high voltage switchgear, where the new configuration is based on the layout of modules forming longitudinally-linked squares, hereinafter denominated "network ring", while the physical layout of the equipment will be in segregated phases, and the electrical insulation will be based on sulphur hexafluoride (SF6), in which the elements are in insulated, independent chambers forming armoured modules.

The object of the invention is to achieve an electrical substation whose implementation supposes, among other services, the improvement of safety and reliability aspects for the electrical system, together with optimum availability and flexibility in operating, permitting easy enlargement and the replacement of elements and/or modules without the need for interruptions in the functioning of the substation, and in a very reduced period of time.

BACKGROUND TO THE INVENTION

In an electrical substation, the fundamental aspects that have to be taken into account for implementation correspond to: the electrical configuration, the electrical insulation technology to be used, and the physical layout of its equipment.

With regard to the electrical configuration of a substation, this is determined by the layout and interconnection of the different elements that form the equipment in general, such as the circuit breakers, disconnectors, transformers for measuring intensity and voltage, electric bars, etc.

Different types of configurations are known and those denominated "one and a half breaker", "double bar" and "classic ring" can be quoted as the most important or those habitually employed. A cutoff element (circuit breaker) and various ones for handling (disconnector) are required in each of these for each input and output position of the substation (line, power transformer, reactance, condenser bench, etc) each substation having an indeterminate number of outputs and inputs.

Of the different types of configuration referred to, that denominated "one and a half breaker" is the most appropriate for critical substations in high voltage, for making the maintenance and operating needs of the system compatible to a great extent (safety, reliability, enlargement, etc) within the cost level acceptable.

The "double bar" configuration is more economic than the "one and a half breaker" one but offers fewer services with regard to availability and flexibility in operating.

The "single bar" configuration is more economical but has the inconvenience that behaviour with regard to availability and flexibility is unacceptable for the most critical voltage levels.

The "classic ring" configuration permits acceptable possibilities for operating at a relatively economic cost, but has the inconvenience that the configuration in itself is very rigid with regard to enlargement.

With regard to the electrical insulation technology conventionally used, this may be exposed to the elements or conventional, that is to say, using the dielectric characteristics of the air, or sulphur hexafluoride (SF6), also denominated armoured.

In the first case, important dimensions are required to guarantee the insulation necessary between phases, the insulation being subject to atmospheric agents that can, in an unexpected manner, cause deterioration, premature ageing and faults in the equipment. For its part, the switchgear, that is to say, the group of elements that constitute the substation, can be independent and permit open solutions, or what is the same, each element or device can be from a different manufacturer.

With regard to the second type of electrical insulation, that is to say, that which uses armoured technology, as the elements are encapsulated in a more insulated environment than air, this permits much more reduced dimensions, with less environmental impact and considerable lower fault indices. On the contrary, they are habitually closed solutions, that is to say, a sole manufacturer exists per installation, forcing dependence on same during the useful life of the substation, in such a way that the repercussions of the faults tend to be serious since they suppose greater unavailability of the installation and affect a greater number of elements, without forgetting that the initial cost is substantially greater than that required for electrical insulation exposed to the elements or conventional.

With regard to the physical layout, or third aspect that has to be taken into account in an electrical substation, different solutions are conventionally offered depending on the other aspects quoted (configuration and insulation technology), together with the operating needs required, an initial definition being necessary that is difficult to modify in the future. In general, three-phase layouts tend to be defined on three heights.

For a balanced distribution of load, that is to say, to avoid power flows of great magnitude over the element (for example, a circuit breaker that joins one side and the other of the substation), and to limit accidents, repercussions on other elements outside the problem, it tends to be recommendable to confront generation inputs with consumption outputs and alternate these confrontations in a reciprocal manner. That is to say, if there are two generation/consumption lines face to face, an attempt must be made for the adjacent confrontation to be consumption/generation, which requires large dimensions and crossings on the majority of the occasions, to make the lines arrive on the correct side, with considerable economic and environmental cost.

DESCRIPTION OF THE INVENTION

The substation in the invention presents the particularity that the electrical configuration is in what has been denominated the "network ring", but not the traditional classic ring, but a special ring whose new characteristic resides in the layout of armoured modules forming longitudinally-linked squares, from whose vertices extend the denominated input/output "positions".

The armoured modules of the electrical substation in the invention are constituted by a circuit breaker, two transformers for measuring intensity and two disconnectors, with the particularity that each one of these elements is located in an independent chamber insulated from the others, all of these forming the armoured module. The electrical insulation used is sulphur hexafluoride (SF6), without rejecting other fluids.

The layout of these elements in independent chambers permits the restriction of possible problems, failures not having repercussions on other chambers or elements, guaranteeing with this the service of the rest of the equipment not affected in the module, in addition facilitating later repair and/or maintenance actions.

On the other hand, the aforementioned independence of the chambers for each armoured module, in combination with the reliability offered by the disconnectors, is of great use in the handling and/or repair of a failed circuit breaker, since they make it possible to perform a complete intervention on the circuit breaker itself and even change the failed part of this, without the need to cut off the voltage at the input/output ends of the module, since it is possible to insulate the fault with the module disconnectors, facilitating the replacement of the rest of the system in a minimum period of time, which supposes a solution to any serious problems originated when this type of breakdown occurs, by using conventional technology for exposure to the elements since, in this case, multiple non-availabilities of longer duration occur, both of the circuit breaker affected and the adjacent ones.

Returning to the "network ring" configuration in the invention, this allows relatively simple enlargements, without anything further than adding new modules forming squares longitudinally, with minimum influence on the rest of the substation, avoiding non-availability of the service.

The connection between armoured modules can be carried out in different ways, either by means of a cable or bare aluminium conduit (switchgear exposed to the elements), or by means of an armoured conduit insulated in SF6, or in a mixed manner, that is to say, some connections by means of bare conduits and other connections by means of armoured conduits.

Furthermore, the ring according to the invention permits closure by joining its two longitudinal ends, which offers possibilities for operating and even higher than those available in conventional "one and a half breaker" configurations.

As an option, the design considers the installation of three transformers for measuring voltage exposed to the elements through the input/output position, one for each phase of electricity, in such a way that one of the transformers is connected electrically to the vertex associated with the ring, while the other two are connected to the "position" after the output disconnector, in this case it being possible to be of the capacitor type to allow communication methods by a carrier wave to be employed, which permits the resources of these elements to be optimised, having the voltage both for the measurement and for the protection and checking of synchronism (for closing the circuit breakers) and the requirements for the communications system by carrier wave in a simple and economic form.

Another advantage supposed by the "network ring" configuration in the invention is the disappearance of the classic connection bars (aerial conductors or aluminium tube) and their associated differential protection, with the consequent economic and space savings.

Likewise, it should be highlighted that these armoured modules accept combinations with other components of technology for insulation exposed to the elements, furthermore permitting the development of any type of electrical configuration, making mixed configurations possible, that allows enlargements of the "one and a half breaker" configuration on an installation to be confronted, for example of a "one and a half breaker".

Other advantages offered by this technology are the following:

It permits the execution of complete "positions" by phases, totally checked in the factory and transported without disassembly, which decreases the assembly and test times in the location of the substation, together with the risk of errors in assembly.

The sole criterion for standardisation of the modules permits the use of these in all substations, independently of the type of insulation and the configuration that each substation has or it is anticipated that it will have. In this way, the engineering, maintenance, assembly costs, etc. are reduced.

It also offers the advantage that it permits any of the components in the armoured module to be substituted, including a pole of a circuit breaker, in a maximum time that can be estimated at 6 hours, without the need for specialised means or personnel, as opposed to that which occurs conventionally where the time is very high, with specialised personnel and requiring discharges to be made from certain parts of the substation.

Equally, the use of the double transformer for measuring intensity for each module permits the overlapping of the adjacent protection zones, in such a way that no areas are left unprotected, making the location of failures in the interior of the modules possible and proceeding with the substitution where necessary.

It is equally fitting to highlight the fact that the armoured modules are immune to atmospheric or environmental agents since they do not contain any external moving parts.

Finally, as another advantage, the fact should be highlighted that the elements exposed to the elements subject to atmospheric agents are fewer, so that the risks both through faults and failures are reduced.

Another new characteristic incorporated in the electrical substation in the invention is that it has the phases segregated, that is to say, that the rings that they form by phases are independent, preventing the formation of short circuits between phases and permitting physical layouts in the different switchgear to be adopted, whether in a ring, in a line or even mixed, in accordance with the space requirements or the arrival of the different positions (input/output), in such a way that the layout in a line provides in a natural manner the inversion of the load line that arrives physically in the same side of the substation, permitting alternating generation/consumption and avoiding the crossing of lines.

Based on the segregation of the phases, it is possible to carry out implementation both externally and internally, making it possible with the same configuration for the substation connection with the transport lines to be performed using both an overhead lead and with an insulated cable, and also with an SF6 armoured conduit or a combination of any of the previous solutions.

External implementation or exposed to the elements with a "network ring" configuration is based on the overhead layout of four bare conductors to make the connection of the three phases of each one of the inputs/outputs that access these possible, by means of bridges to establish in phase electrical continuity.

This layout or implementation is that which gives place to the segregation of the phases, permitting the interconnection of the different inputs/outputs to and from the substation, with this avoiding the surrounding routes and crossings between lines that are produced generally and conventionally in existing substations.

In the external implementation, the layout of the conductors can be on one or two height levels, while in the internal implementation, the layout of the modules is made in a building with one or various floors, accesses being permitted for inputs/outputs of the modules, in such a way that any connection required is possible in practice, with low costs for the aforementioned installations.

In the aforementioned implementation exposed to the elements two levels are established, one corresponding to the modules that form the rings and the other corresponding to the connection conductors, and it is possible to define or establish a third level for connections that permit lateral outputs or crossing between lines or even the closing of the ring to be made, which avoids making crossings away from lines, as well as providing greater facilities for operating and greater compaction.

The fact should equally be highlighted that the segregation in the "network ring" configuration makes it possible to establish a modularity that, with minimum changes in the project, permits layouts that are unheard of in any other solution of those used up to the moment in high voltage substations, all of this in such a way that base elements of equal physical configuration will be able to be performed with the same means of location and assembly, that is to say, standardised, in such a way that those base elements will have common characteristics with minimum variations, which permits them to be constructed and tested in the factory and later transferred and assembled in the substation without any engineering work, since removal and connecting will always be the same and the variations they have among them will be foreseen solely to be able to carry out, in some cases, for example, an enlargement of the substation and, in other cases, for example, for making lateral outputs, etc. in precise terms being able to implement a substation as if it were a puzzle.

By means of the aforementioned modularity, the delivery times are less, as will be the assembly time, independently of any enlargement or modification not needing to leave a part of the substation out of service. Furthermore, due to the modularity, the implementation of the base elements and/or implementation of a substation and enlargement of this is possible, in any place, whatever the land relief.

The dimensions of the substation based on the novelty aspects referred to previously, with respect to an equivalent of, for example, a "one and a half breaker", are much more reduced both with respect the total surface area necessary and the height, which in combination with the possibility of choosing different colours for the armoured modules, permit the environmental impact to be reduced in a significant manner.

On the other hand, the layout of the segregated phases carries with it the advantage of totally avoiding in practice the possibility of short circuits between phases occurring inside the substation, which notably improves the efficiency of these substations in the global electricity system.

Equally, and as another of the advantages, the fact can be quoted that the segregated "network ring" configuration permits users of the installation or substation to be able to carry out later enlargements with armoured modules from manufacturers who are different from those used in the initial installation or substation, always provided that they comply with certain basic characteristics that it is easy to comply with for any of the manufacturers of this type of equipment.

The execution of an electrical substation based on the aforementioned segregated "network rings" and with armoured modules can present certain limitations when voltages reach 400 KV, since from these voltages the total assembly and tests can only be carried out in the installations of the manufacturer of each one of the modules, but not of the group of these, that is to say, not a complete substation.

Therefore, to permit the development of a substation of 400 KV or higher voltages without problems, an alternative to the execution of a ring has been foreseen, based on which it is possible to carry out the total assembly and tests in the installations of the manufacturer himself, in such a way that only the assembly of the bushings or connections to cables required will be necessary in the installation or substation.

More specifically, the alternative to the execution of the ring in the invention consists of a compact ring whose four armoured modules are to be found in a layout grouped on two levels; that is to say, with two modules on one level and the other two modules on another level, in such a way that on one of the ends the modules on each level are connected to each other, while on the opposite end each module on one level is connected to the module on the other level, thus obtaining the electrical schematic of the corresponding ring, with the same particularities and characteristics as those of the "network ring" previously described. Evidently, the aforementioned layout in a compact ring on two levels will be implemented in each one of the three electricity phases in the installation.

The execution of this layout in a compact ring permits the development of high voltage substations, being of particular application in 400 KV ones and even those of higher voltages, in such a way that the total assembly and tests may be carried out in the installations of the manufacturer himself, carrying out the transport to the substation, in which only the assembly of the bushings or connections to cables will be necessary, permitting the successive growth of the substation by means of the addition of similar groups, that is to say, of compact rings on two levels.

As has already been said, each compact ring on two levels is formed by four armoured modules, in this case up to four inputs/outputs being usable, in such a way that the application for the connection of a greater number of inputs/outputs can be done by means of successive additions of compact rings, but only three modules and two inputs/outputs for each addition, the missing module being substituted by a simple SF6 gas connection.

The implementation is performed by means of segregation of the three existing phases in the high voltage systems, segregation that can be done at the same level or on different levels, according to the needs of each case, the layout to be adopted depending on the type of output selected, since with four inputs/outputs by cable the layout has practically no other restrictions than those of the physical space that the dimensions of the compact rings has, with regard to whether higher outputs by Bushing (air insulation bushing, for connecting to an insulated conduit) are used, these require dimensional space for insulation according to the standards and voltage level.

The following can be quoted among the advantages that can be obtained from this layout with a compact ring on two levels:

Maximum use of space.

Minimum impact on the surroundings.

Minimum cost of the armoured installation on reducing the length of the armoured connections necessary to the maximum.

Maximum modularity and, as a consequence, adjustment of the cost of the installation to its real needs at all times of its life.

Maximum reliability. Permitting the overall substation to be manufactured, assembled and tested in the factory and transported to the place of installation without the need for any other disassembly than that of the input/output bushings.

Minimum installation and testing times.

Reduction of costs through standardisation in that manufactured for the substations, a level clearly higher than the present one existing at these voltage levels, in which until now the objectives were put at the level of the compact manufacture of modules, a previous and lower level to that of the substation, of which they are components.

The possibility of making the materials of different manufacturers compatible, as a consequence of the modularisation existing. That is to say, the compact rings of any manufacturer can be used and enlarged with compact rings from another different manufacturer.

It permits different layout possibilities for each one of the modules, to adapt them to the technical characteristics of each one of the manufacturers and the characteristics and location of their respective managements and external dimensions.

BRIEF DESCRIPTION OF THE DRAWINGS

In order to complement the description to be given below and with the object of helping to have a greater understanding of the characteristics of the invention, this descriptive report is accompanied by a set of drawings on the basis of which the innovations and advantages of the electrical substation that is the object of the invention will be understood more easily.

FIG. 13. Shows the schematic corresponding to the form of achieving natural alternating of generation/consumption, starting with a ring configuration in order to reach an in-line configuration without having varied the modules.

DESCRIPTION OF AN EMBODIMENT OF THE INVENTION

Figure 1:
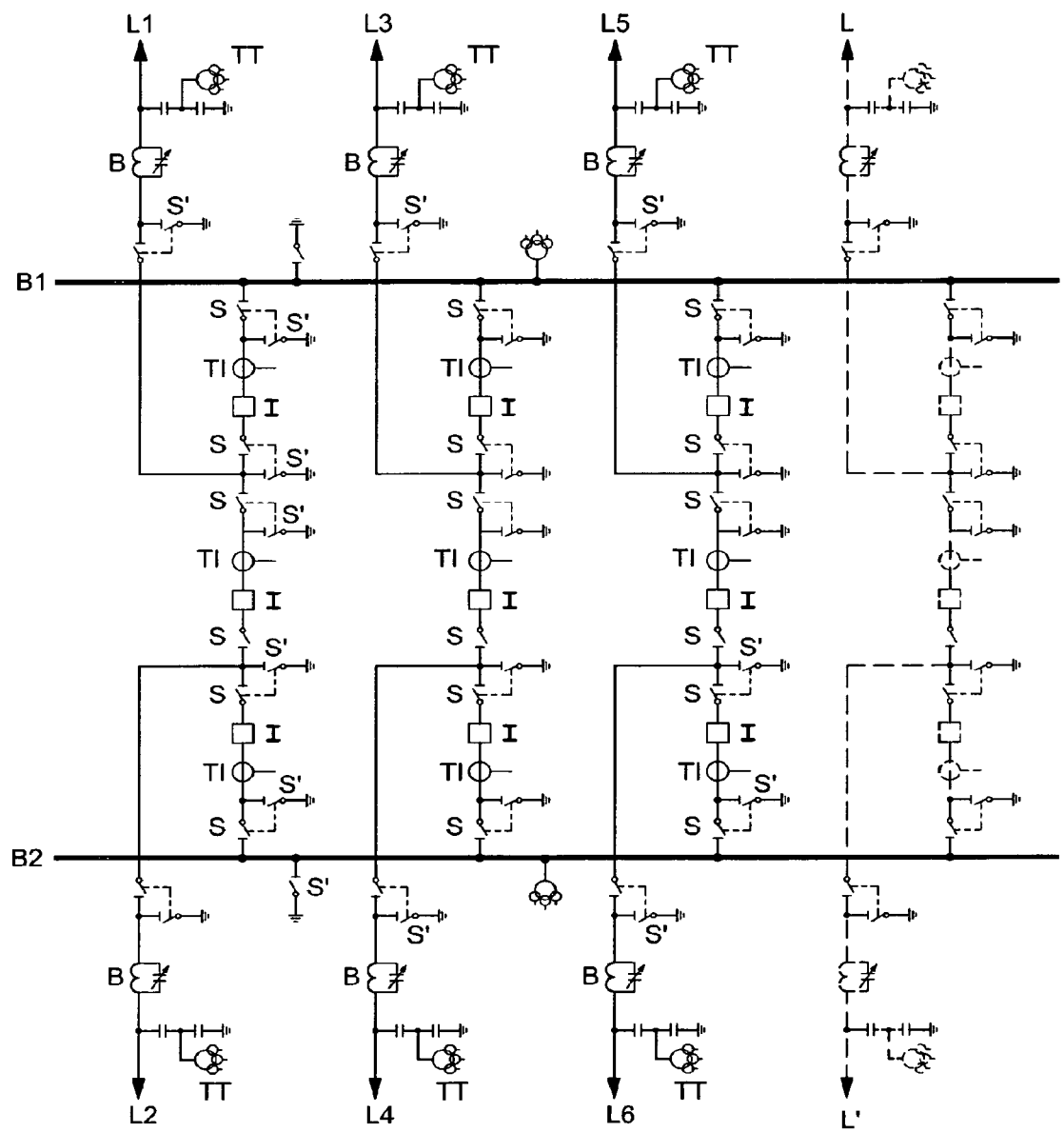
FIG. 1. Shows the schematic corresponding to a conventional "one and a half breaker" configuration, used in electrical substations, according to a single wire representation.

In view of the figures commented on and making reference specifically to FIG. 1, the schematic representation of a conventional "one and a half breaker" configuration can be observed, with the main electric bar B1 and B2, the L1-L2, L3-L4, L5-L6 input/output positions, together with a possible future L-L' input/output position, according to a representation with the dashed line. Between the main bars B1 and B2 the I circuit breakers, the TI intensity transformers and the S disconnectors are arranged, for each phase, together with the S' grounding disconnectors, incorporating the TT voltage transformers and the B blocking coils at the outputs, all in accordance with the single-wire representation of this FIG. 1.

Figure 2:
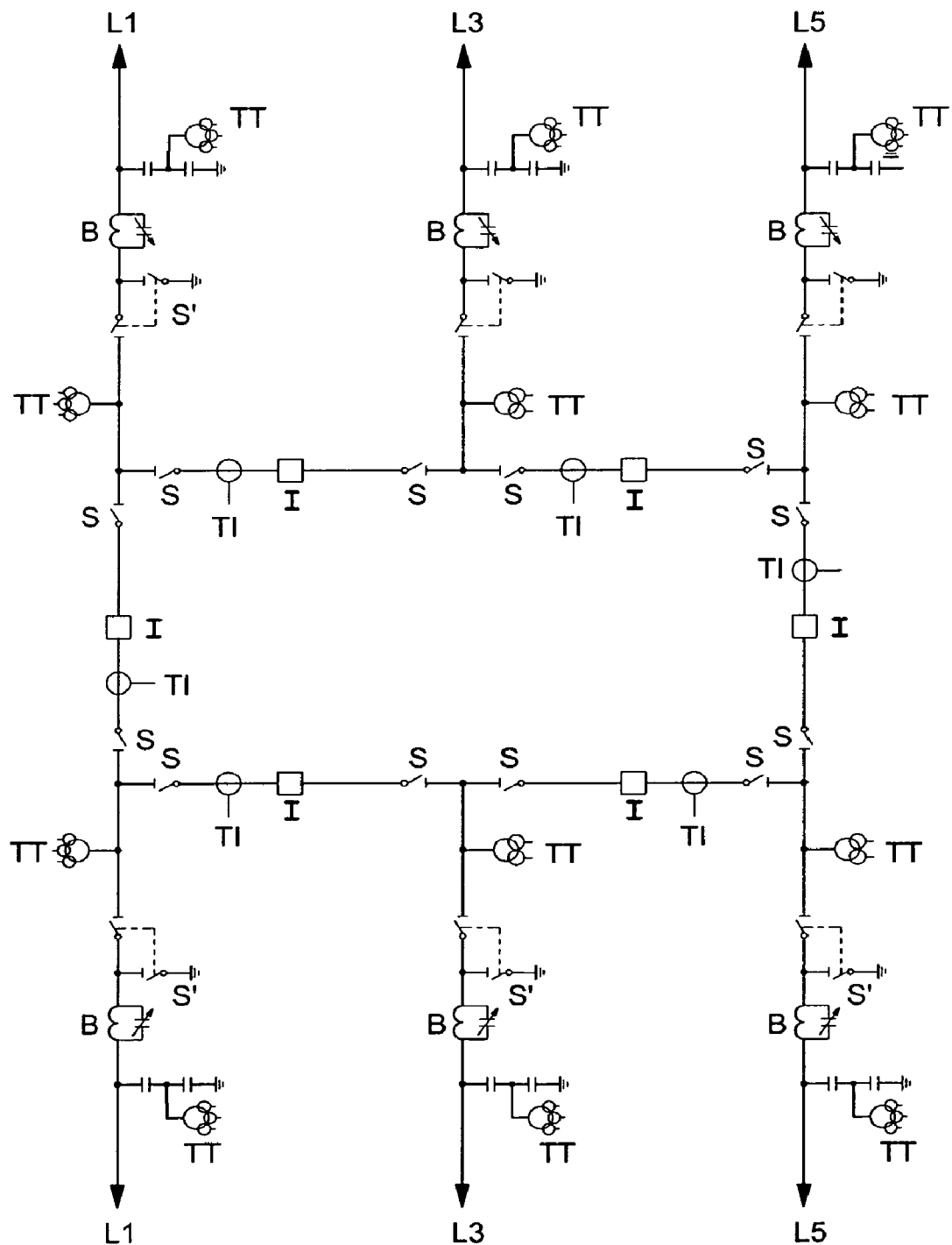
FIG. 2. Shows the schematic corresponding to a conventional "classic ring" configuration, used in electrical substations, according to a single wire representation.

The classic ring configuration is shown in FIG. 2, with the L1 input/output positions, showing on the ring the I circuit breakers, the TI transformers and, in positions L1, L3 and L5, the corresponding TT voltage transformers, the B blocking coils and the S' grounding disconnectors.

Figure 3:
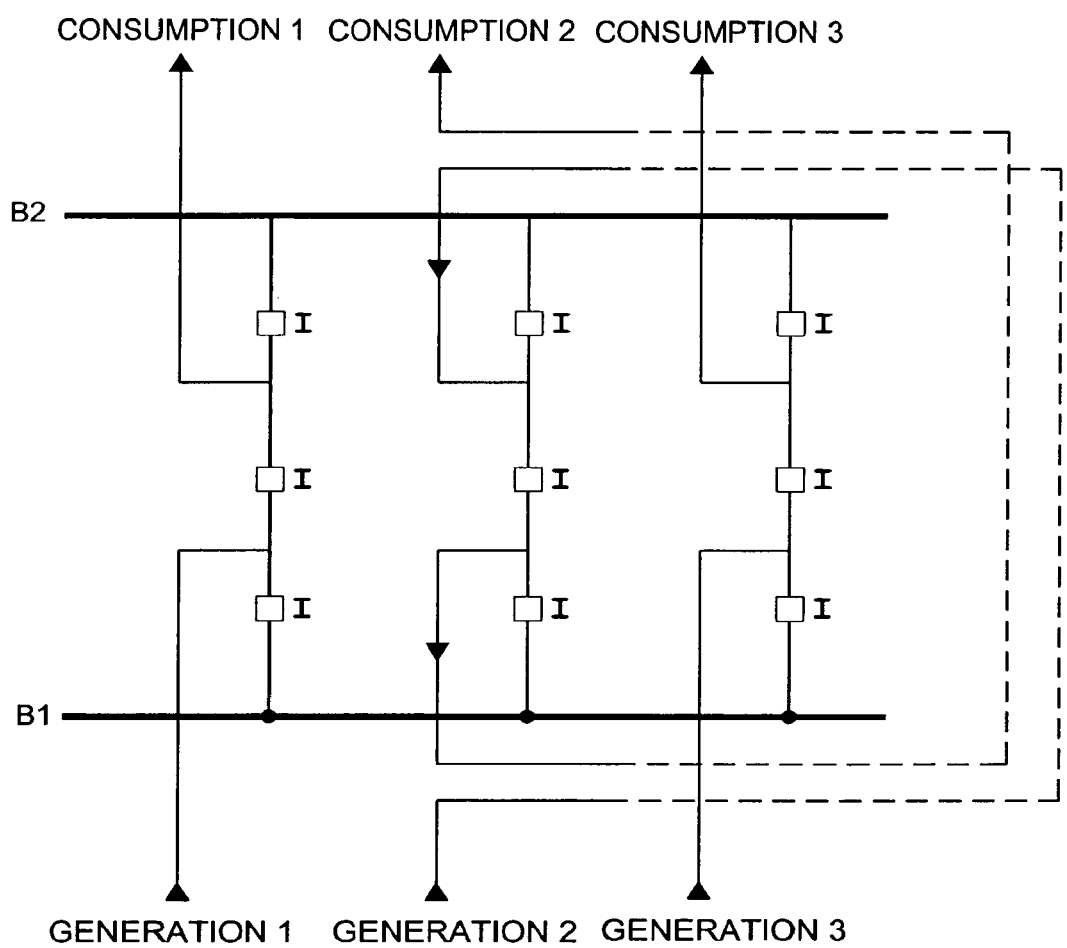
FIG. 3. Shows the schematic corresponding to a need for crossings required for alternating generation/consumption, in a used in electrical substation with a "one and a half breaker" configuration, in a single wire representation.

A schematic configuration of the conventional one and a half breaker is shown in FIG. 3, between whose bars B1 and B2 only I circuit breakers have been represented, since the rest of the components have not been represented, in the same way as they have not been represented in the generation/consumption positions 1, 2 and 3, all this in order to avoid complexities, as the sole intention of FIG. 3 is to show the need for crossings for alternating generation/consumption, since the convenience of confronting generation/consumption requires, in this conventional configuration, carrying out a crossing for alternating this generation/consumption, a crossing which leads to the need for large dimensions to make the lines arrive at the adequate side.

Figure 4:
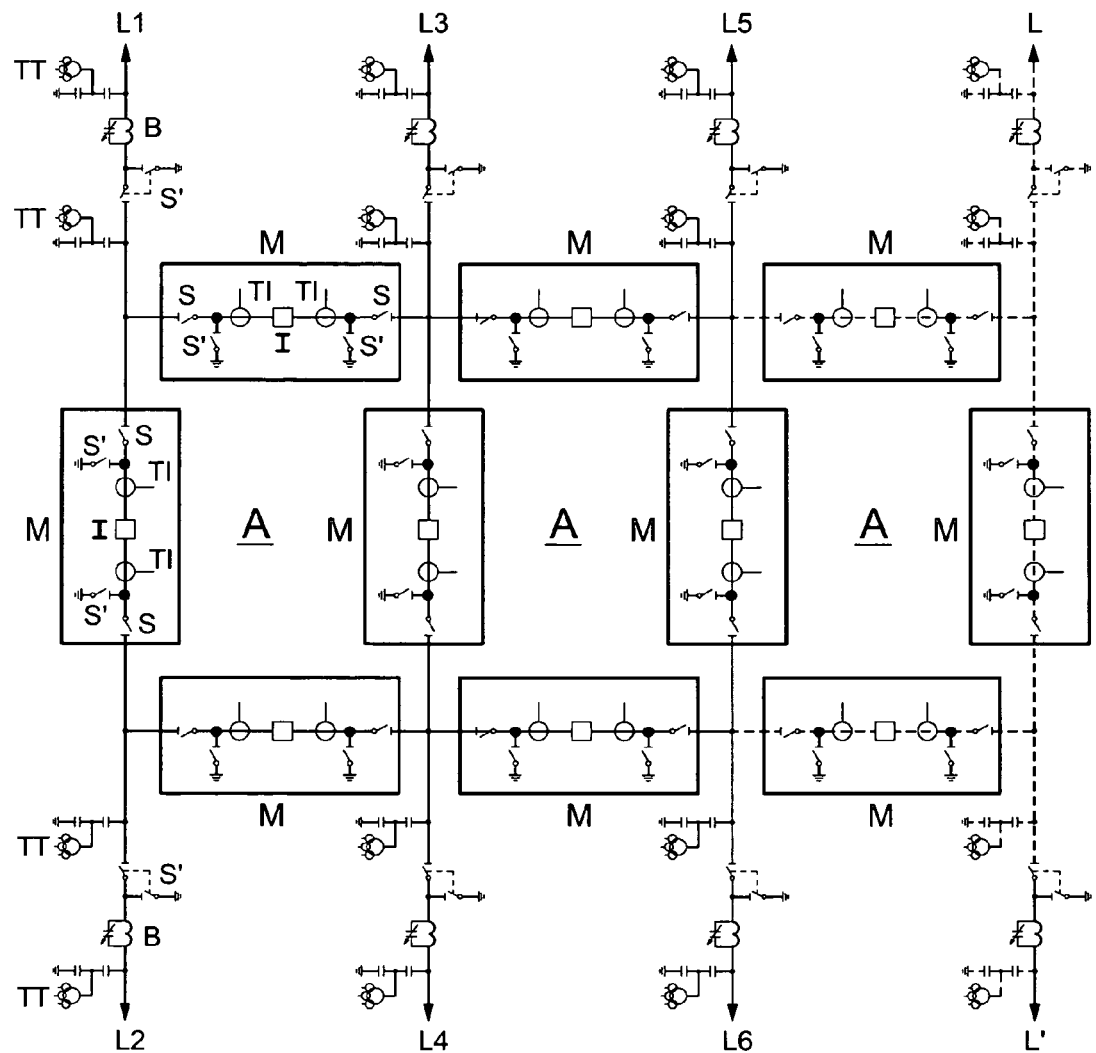
FIG. 4. Shows the schematic corresponding to the "network ring" configuration, used in the electrical substation in the invention, in a single wire representation.

These problems are resolved by means of the novelty aspects considered in the electrical substation in the invention, where the configuration is of a "network ring" as shown in FIG. 4, but not a classic ring like the one shown in FIG. 2, but a ring that is configured by arranging, segregating the phases, in armoured modules M forming longitudinally-linked squares, from whose vertices the L1-L2, L3-L4, L5-L6 input/output positions start, offering the possibility of enlargement without any type of problem, according to position L-L', represented with a dashed line. In this FIG. 4, each armoured module M is made up of an I circuit breaker, two TI intensity transformers and two S disconnectors, complemented by the S' grounding disconnectors, while in the positions L1-L2 and the rest they have a TT voltage transformer and B blocking coil arranged in each phase, in such a way that one of the transformers is connected to the respective vertex of the corresponding ring, while the other two, one per phase, are located in the corresponding "position" after the S' output disconnector.

This configuration, in accordance with that shown in FIG. 4, allows relatively simple enlargements by simply adding new squares or rings longitudinally, with minimum influence on the rest of the substation, avoiding service unavailability, while allowing connection between armoured modules M without distinction, either by means of cable or a bare aluminium conduit, or by means of a mixed solution, that is to say, with bare conduits and others by means of armoured conduits.

Figure 5:
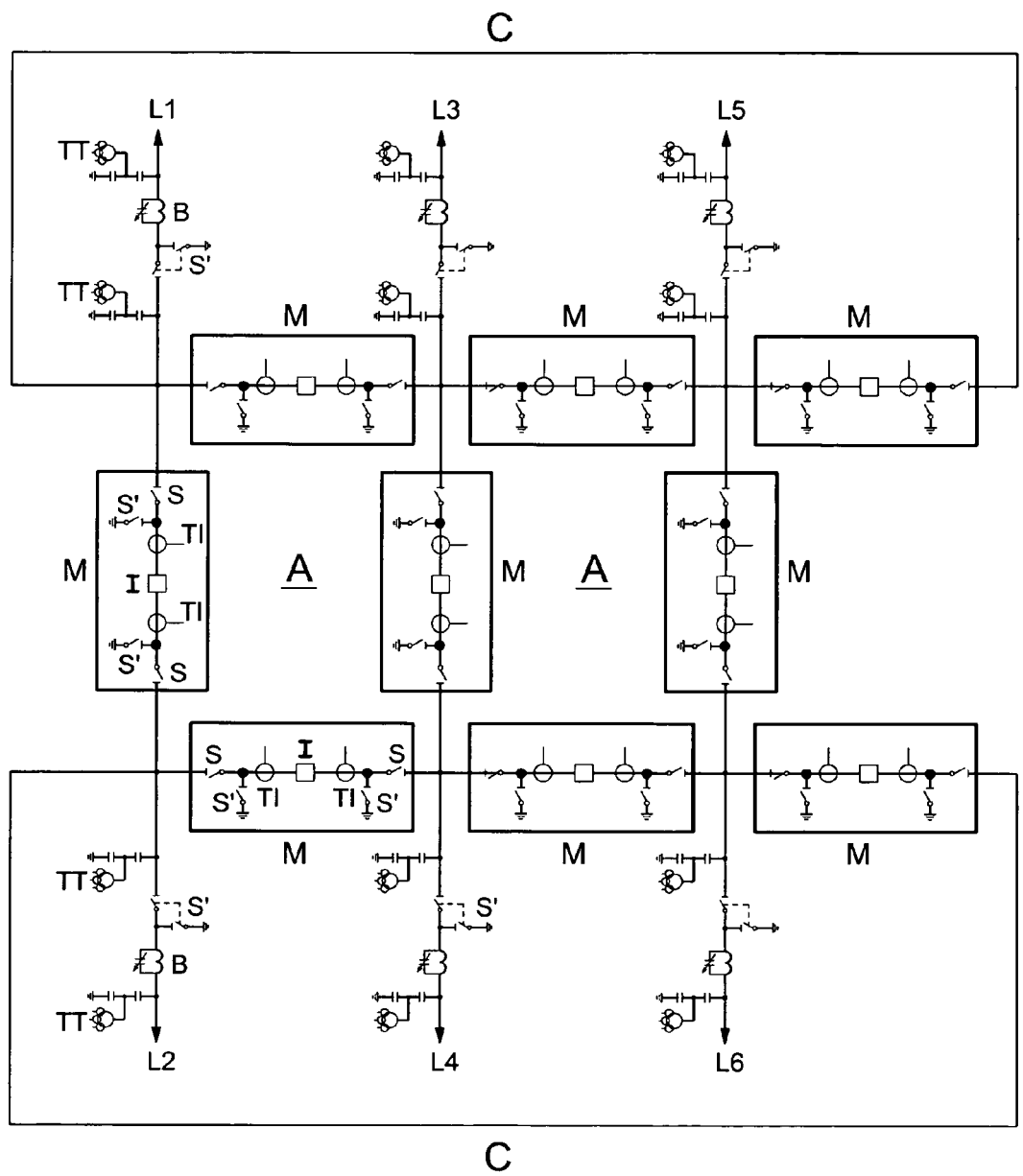
FIG. 5. Shows the schematic in the previous figure with the ring closed over it.

Likewise, the "ring network" configuration referred to allows its closure by means of line C shown in FIG. 5, joining the ends of the arrangement of M modules arranged longitudinally, providing operating possibilities similar and even higher than those available in conventional "one and a half breaker" configurations.

With regard to the TT voltage transformers connected to the corresponding L1-L2, L3-L4, L5-L6 or L-L' positions, as mentioned previously, they are connected after the corresponding S' output disconnector, these TT transformers having the possibility of being of the capacitive type to allow the use of communication methods using a carrier wave and, in this way, optimising the resources of these elements, using the voltage both for measuring and for protection and checking of the synchronism and the requirements for the communications system using a carrier wave in a simple an economic manner.

Figure 6:
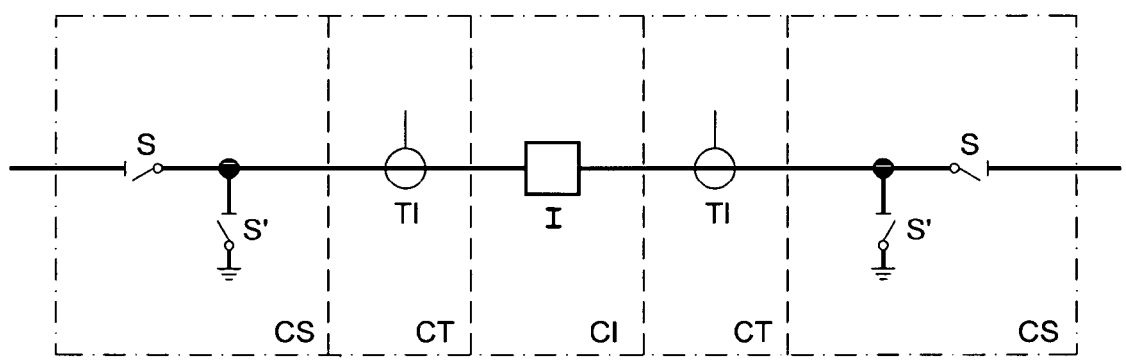
FIG. 6. Shows the schematic corresponding to an armoured module in the electrical substation in the invention, with the independent chambers for the circuit breaker, for each of the two intensity transformers and for each of the disconnectors.

With regard to M armoured modules, they will be standardised and will include, as stated previously, an I circuit breaker, two TI intensity transformers and two S disconnectors, complemented with the S' grounding disconnectors, with the particularity that each of these elements is arranged in an independent chamber and insulated by means of SF6, as it can be seen in FIG. 6 that circuit breaker I will be in an insulated CI chamber independently of the CT chambers where the TI intensity transformers are located, in the same way as the CI chamber of the circuit breaker, in an insulated and independent manner from the CS chambers corresponding to the S disconnectors.

The layout of independent, insulated chambers, for each element, will permit the restriction of possible problems, faults not affecting other compartments, in such a way that the service of the rest of the equipment of module M not affected is guaranteed, this being a characteristic that as an addition enables later repair or maintenance actions.

On the other hand, based on this independence between the chambers referred to and the reliability that the S disconnectors offer, they are specially useful in the case of a fault in circuit breaker I, as it allows the whole intervention to be carried out, even the change of the unit, in circuit breaker I without the voltage having to be cut off from the ends of the M module, with which the M armoured modules allow the fault to be insulated with the S disconnectors, enabling the replacement of the rest of the system in minimum period of time.

Figure 7:
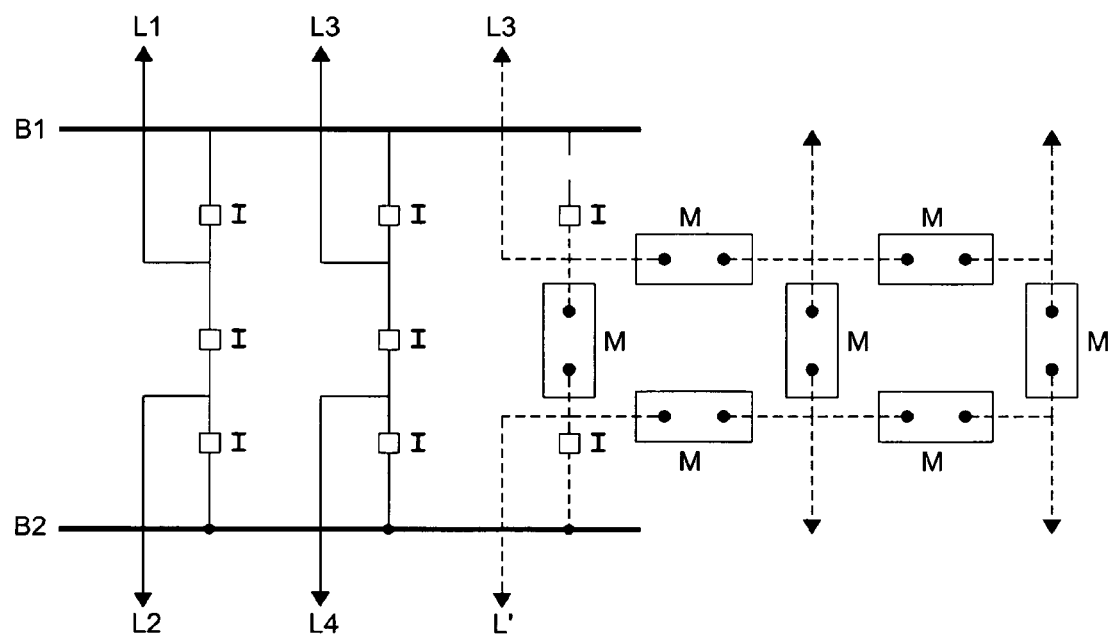
FIG. 7. Shows the schematic corresponding to the combination between a conventional one and a half breaker configuration configuration, used in the electrical substation in the invention and the "network ring" configuration that forms part of the object of the invention, in a single wire representation.

On the other hand, the armoured modules M admit combinations with another series of technology elements for protection in the open, as shown in FIG. 7, where there is a part with a "one and a half breaker" configuration, with bars B1 and B2, I circuit breaker and positions L1-L2, L3-L4 and position L-L' for enlargements, to connect with the "ring network" configuration based on the armoured modules M with input/output positions, also indicated with a dashed line, as an enlargement that forms part of that determined by the aforementioned M modules in FIG. 7. That is to say, the integration of the elements defined by M modules allows the development of any electric configuration, enabling mixed configurations and, in this sense, allows enlargements to be undertaken in a "ring network" configuration on a "one and a half breaker" installation as shown in this FIG. 7.

Figure 10:
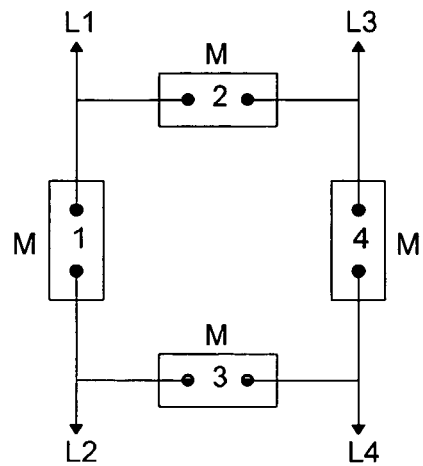
FIGS. 10, 11 and 12. Show other schematics in a single wire representation of a ring configuration, in line and mixed, with the same armoured modules, all in accordance with the object of the invention.
Figure 11:
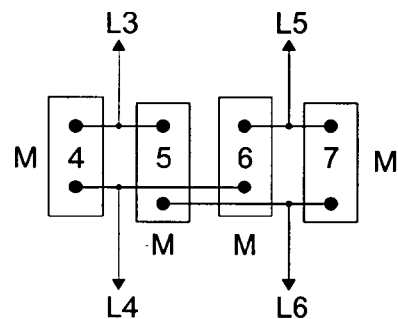
Figure 12:
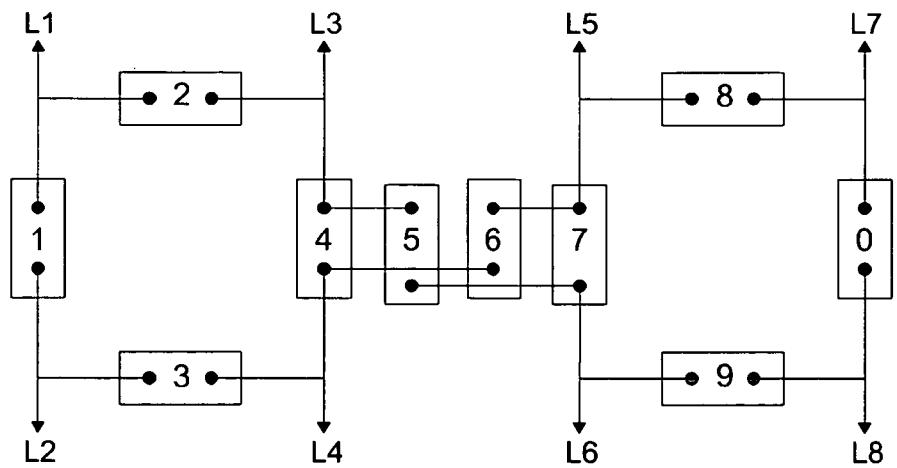

FIGS. 10, 11 and 12 show a ring configuration formed for M armoured modules, identified with internal reference 1, 2, 3 and 4 respectively, allowing different physical layouts to be adopted, with the possibility of going from FIG. 10 to FIG. 11 where the physical layout is in a line, while FIG. 12 shows a mixed combination, that is to say, a combined physical layout of rings and line, always with the same representation with regard to single-wire arrangements (ring).

FIG. 13 shows how the layout can be changed from a ring to another one in line, in which in a natural way the electric inversion of the connection of loads that physically arrive on the same side of the substation can be carried out, allowing alternating generation/consumption and avoiding crossings between lines.

Figure 8:
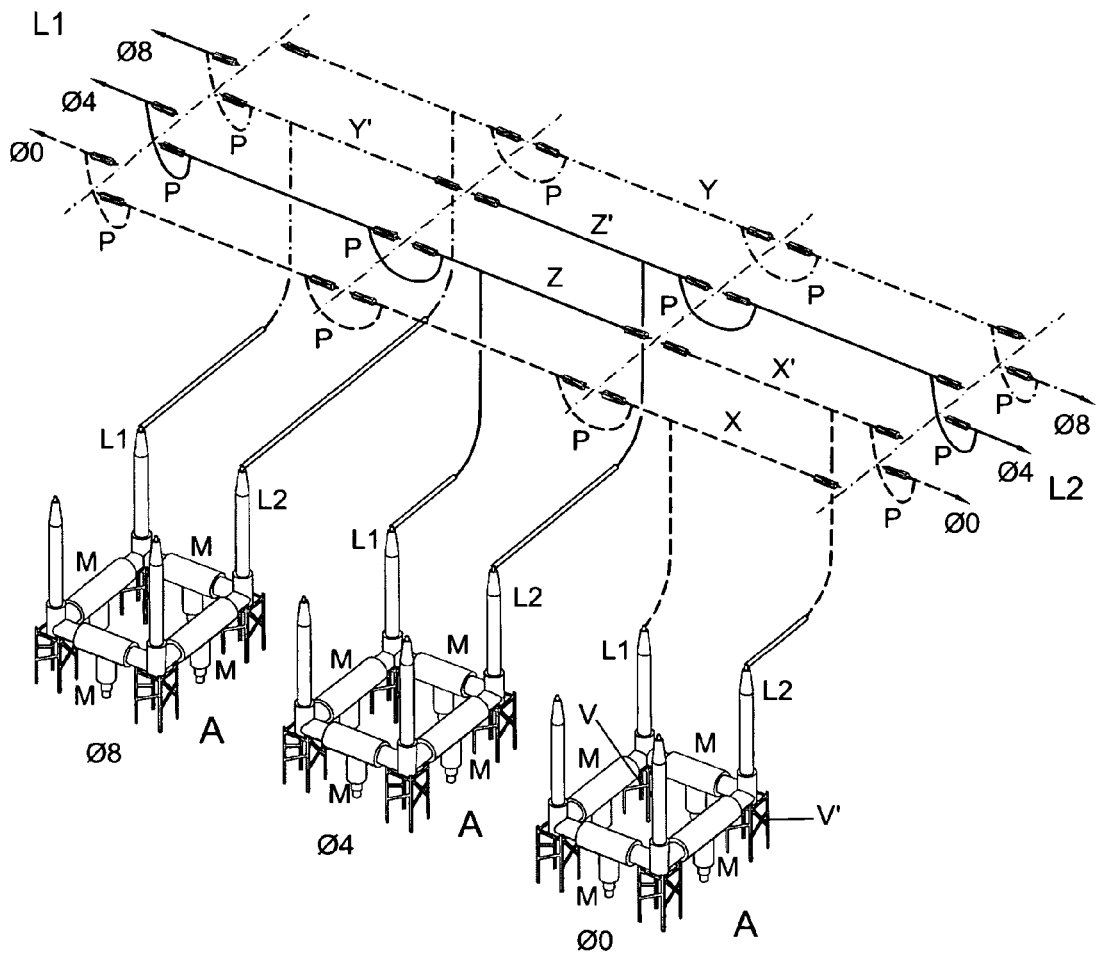
FIG. 8. Shows the schematic corresponding to the form of segregation of the phases in the "network ring" configuration of the invention, with two levels, one corresponding to the ring modules and the other corresponding to the conductors or connection lines.

With regard to the physical layout of the segregated phases, in accordance with that shown in FIGS. 8, 9, 14 and 15, it should be said that two levels are shown in FIG. 8, one corresponding to independent A rings formed by armoured modules M with the elements for their connection to respective phases $\emptyset 0$, $\emptyset 4$ and $\emptyset 8$ of positions L1-L2, in such a way that this level formed by A rings is connected to the phases referred to, these determining a second level, and where the three phases are defined by four conductors, two of them referred to with letters X and Y, and the other two referred to with the letter Z, with the particularity that the first two only correspond to $\emptyset 0$ and $\emptyset 8$, these phases being completed with independent sections X' and Y', respectively, belonging to Z conductors, these last two forming the third phase, with the particularity that the electrical continuity of the conductors is made by means of P bridges, since all of them are divided into sections, logically having foreseen that independent sections X' and Y' cannot be bridged with Z conductors since a short-circuit would occur since they are of different phases.

Figure 9:
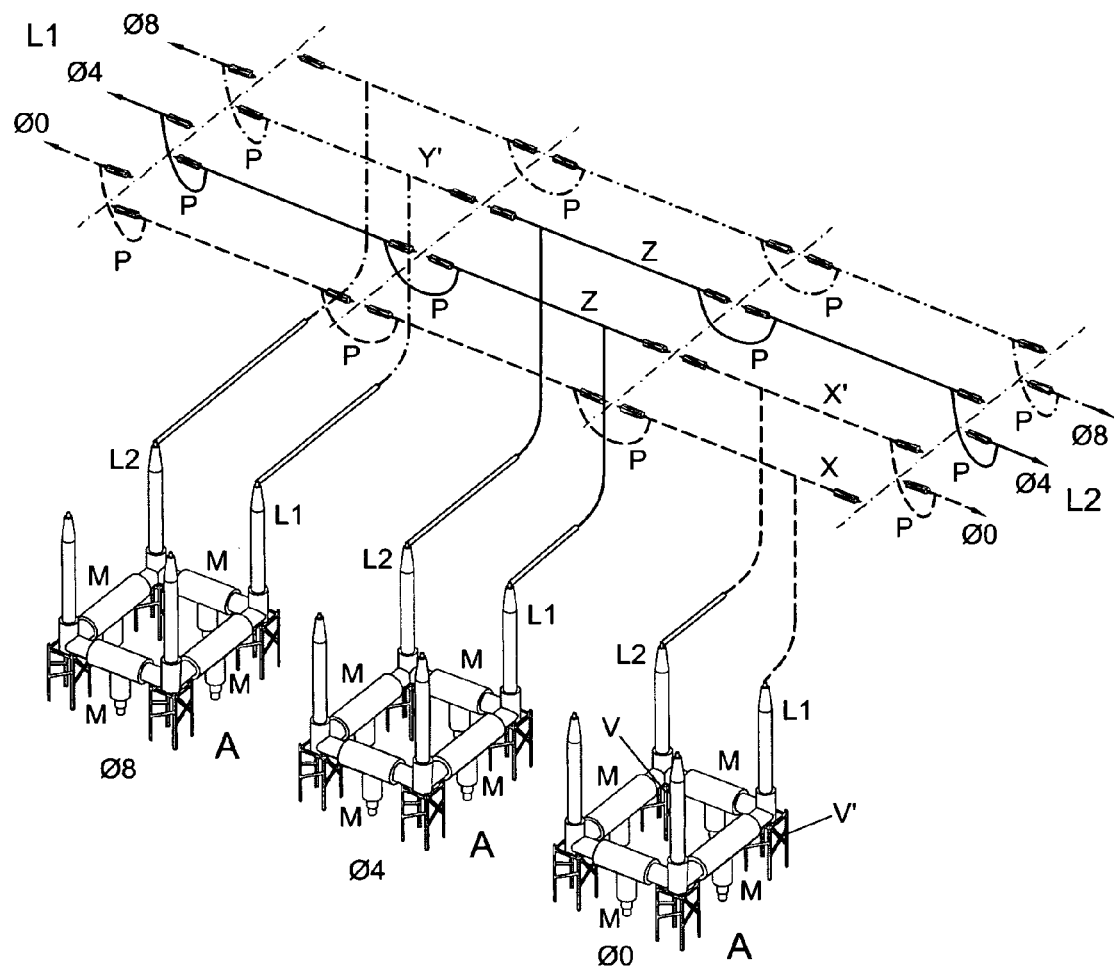
FIG. 9. Shows a schematic like the one in the previous figure, but showing the arrival of lines on the opposite side.

If FIGS. 8 and 9 are observed and compared, it can be checked how vertex V or ring A on the right is connected, in FIG. 8, with conductor X, while vertex v1 of this same ring A is connected with the section of conductor X' in that same phase, while in FIG. 9 they are connected the other way round, that is to say, vertex V connected to section X' and vertex V' connected to conductor X, but in both cases to phase $\emptyset 0$, with the possibility of checking how alternating is carried out without crossings, only taking advantage of the fact that one independent section X' or Y', useless for the Z conductors of a phase, can be used to define the other phases X and Y, respectively.

Therefore, in the case of wanting to modify the physical layout of the elements, it will be sufficient to cancel the P bridges and reposition them in another way, all based on using four conductors to determine the three electric phases.

Figure 14:
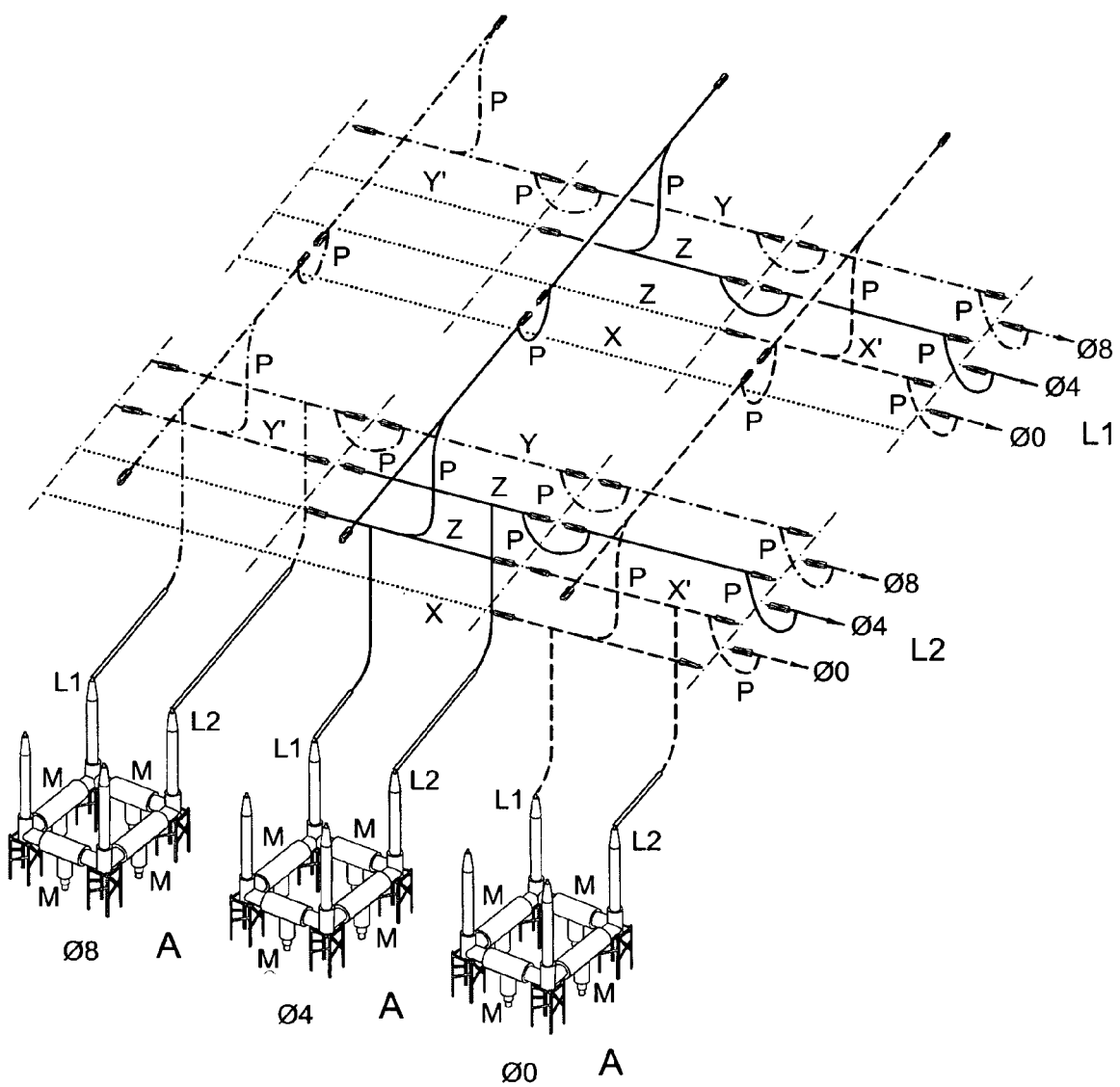
FIG. 14. Shows a schematic like that in FIG. 8, but including a third level for crossings.

By means of this layout, a third level could be used for lateral outputs as shown in FIG. 14, in which positions L1 and L2 are on the same plane, while the phases that correspond to the lateral outputs are on another higher plane, according to a trajectory layout perpendicular to the phases of positions L1 and L2 referred to previously, establishing the connection by means of the corresponding P bridges.

Figure 15:
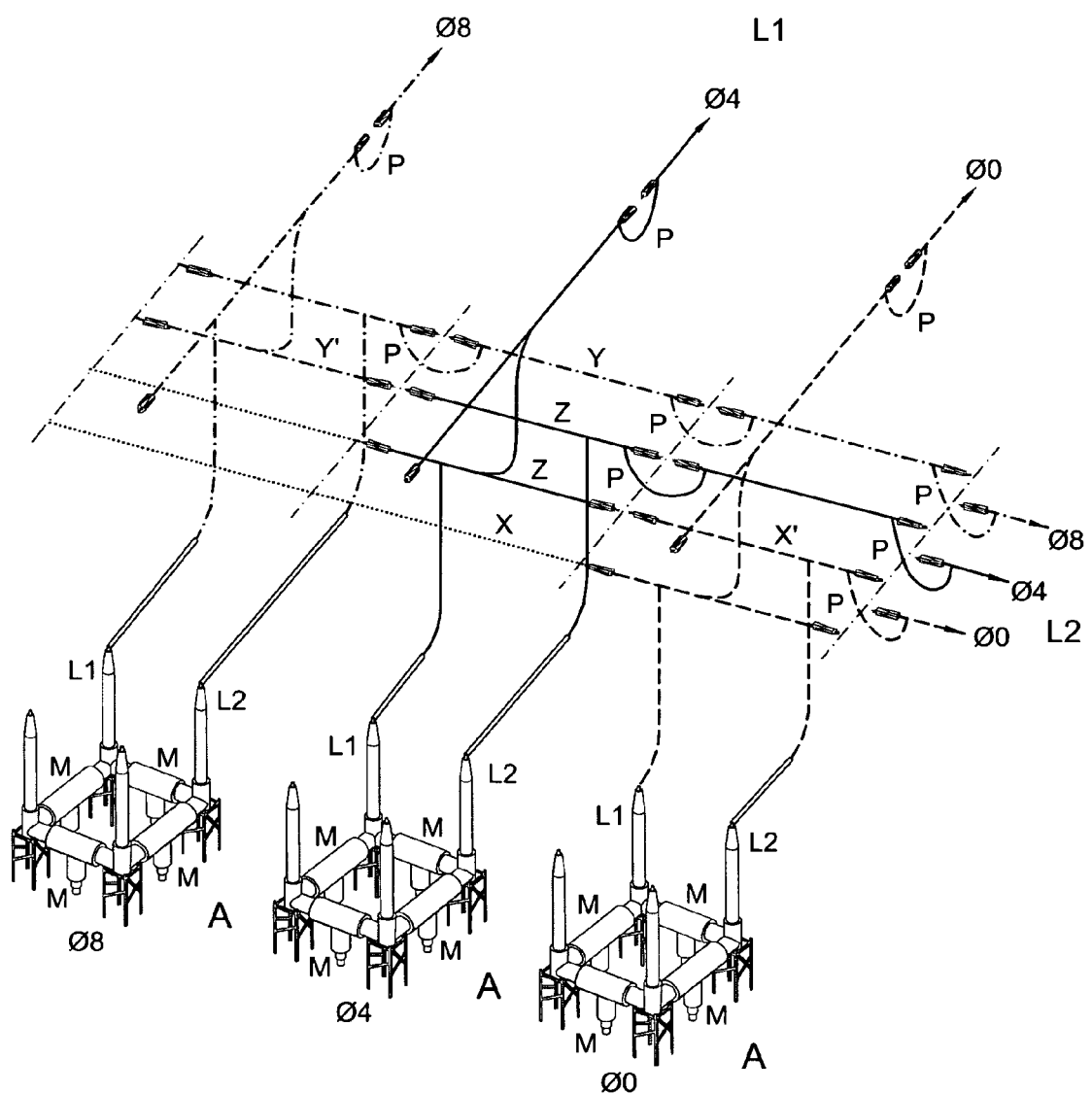
FIG. 15. Shows a schematic like that in FIG. 8, but including a third level for a side output.

The implementation of the third level for the lateral outputs is specifically shown in FIG. 15.

Therefore, this third level allows another layer of connections to perform lateral outputs as can be seen in FIG. 15, crossings between lines or electric bars as shown in FIG. 14, or the ring closure itself, offering greater facilities for operating and greater compacting, while avoiding line crossings far away.

Figure 16:
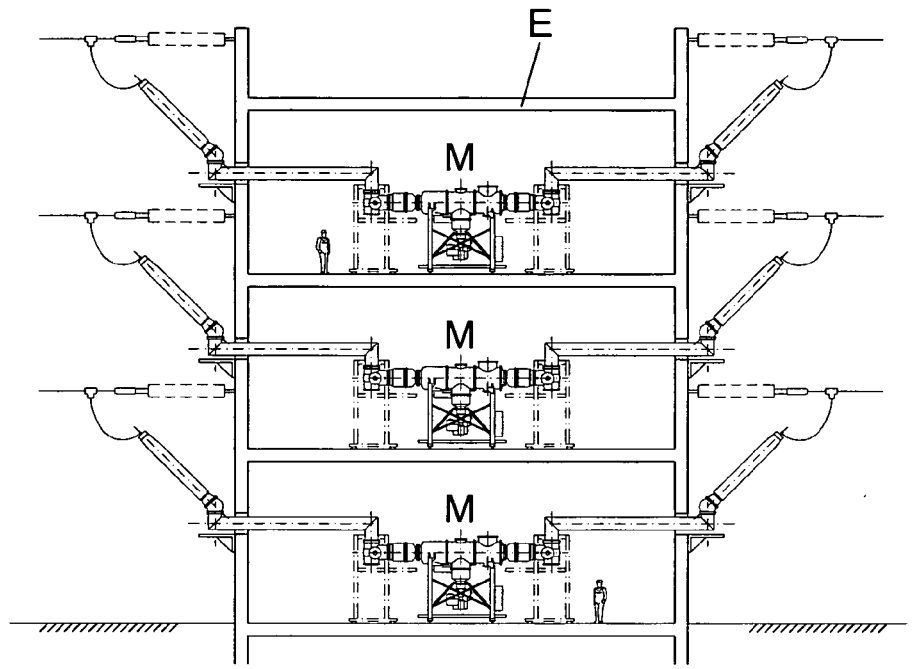
FIG. 16. Shows a physical representation of the "ring network" configuration with the installation in a building, three heights being seen, one for each phase.
Figure 17:
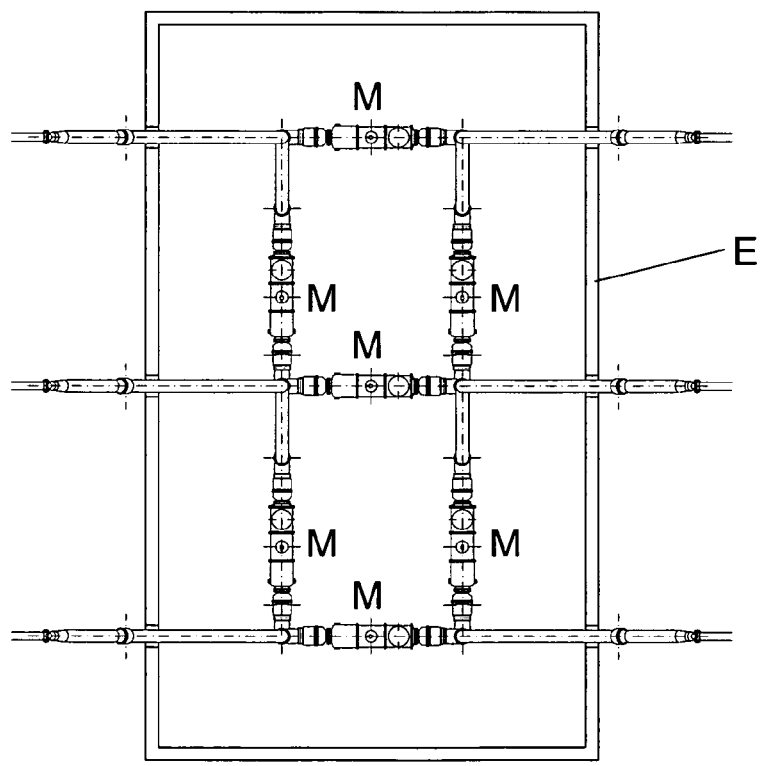
FIG. 17. Shows a ground view of the previous FIG. 8.

The technical layout in segregated phases also admits internal installation as shown in FIGS. 16 and 17, with the layout of M modules inside a building referred to as E in general, with one or various floors, FIG. 16 showing three floors, one for each phase, and a ground view of FIG. 16 being represented in FIG. 17, showing the "ring network" configuration on the E building itself.

Figure 18:
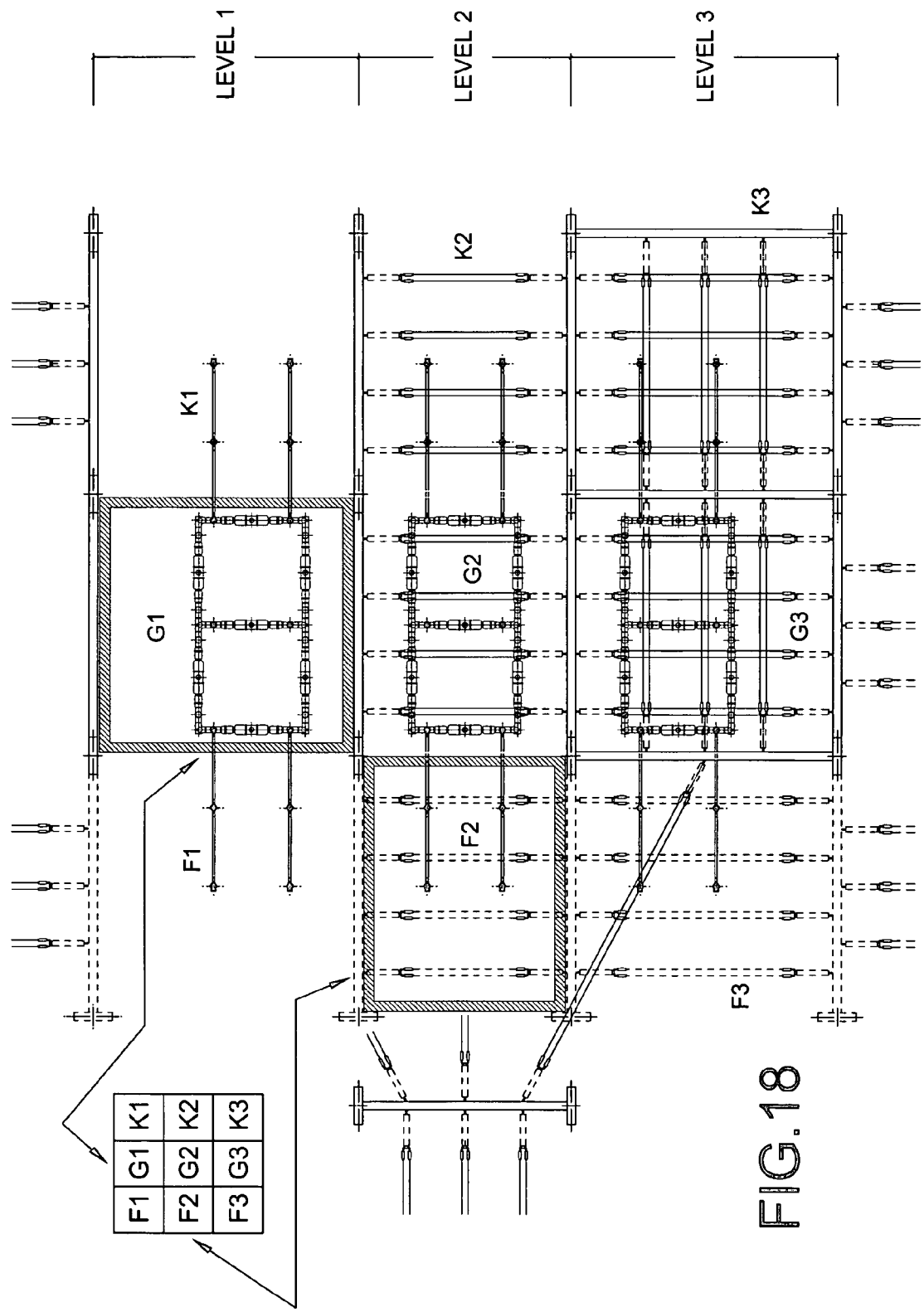
FIG. 18. Shows a ground schematic representation of a sector of an electrical substation that is the object of the invention, according to views corresponding to the different levels, with a detail in a square allowing the different elements to be seen.

As an example of the modularity provided by the use of the M armoured modules and the segregation of phases, together with the physical layout of the equipment, below and in accordance with FIGS. 18 and 19, a substation open to the elements with six inputs/outputs will be considered, defining the basic standard three-dimensional elements F, G, K that are inter-connectable with each other to make up the configuration sought. In the example of FIG. 18, the base elements F and K, with references in the three levels as F1, F2, F3 and K1, K2, K3, correspond to input/output position connections, while base elements G, referred to with G1, G2 and G3 for the three levels, are base elements that contain the M armoured modules, in such a way that the combination of these elements F, G and K provides different alternatives for resolving situations of difficult implementation, such as areas with drops, river beds, etc.

With the purpose of understanding the area or part occupied or corresponding to the base elements F, G, K, in FIG. 18, a detailed square showing base elements F1, G1, K1; F2, G2, K2 and F3, G3, K3 has been provided, showing squares G1 and F2 as an example, with two arrows, and their correspondence with the base elements framed in a shaded manner over FIG. 18 itself.

Obviously, these are base elements that, being standard, can be assembled and connected in a grouped manner or independently, with the purpose of adapting to the different physical conditions that may be given at the locations available to the substation. In FIGS. 18 and 19 it is shown how F base elements are foreseen for lateral outputs, this being the area on the left, represented in FIG. 19, being the space scarcely occupied by that base element for connection which can be taken advantage of for implementing other components, such as a TP power transformer, the same happening in the area for location of K base elements, where other elements can also be implemented, as it is occupied only with the means for connection to the electric bar or the lines located at a higher level, while base element G, corresponding to armoured modules M, occupies the entire area.

Figure 19:
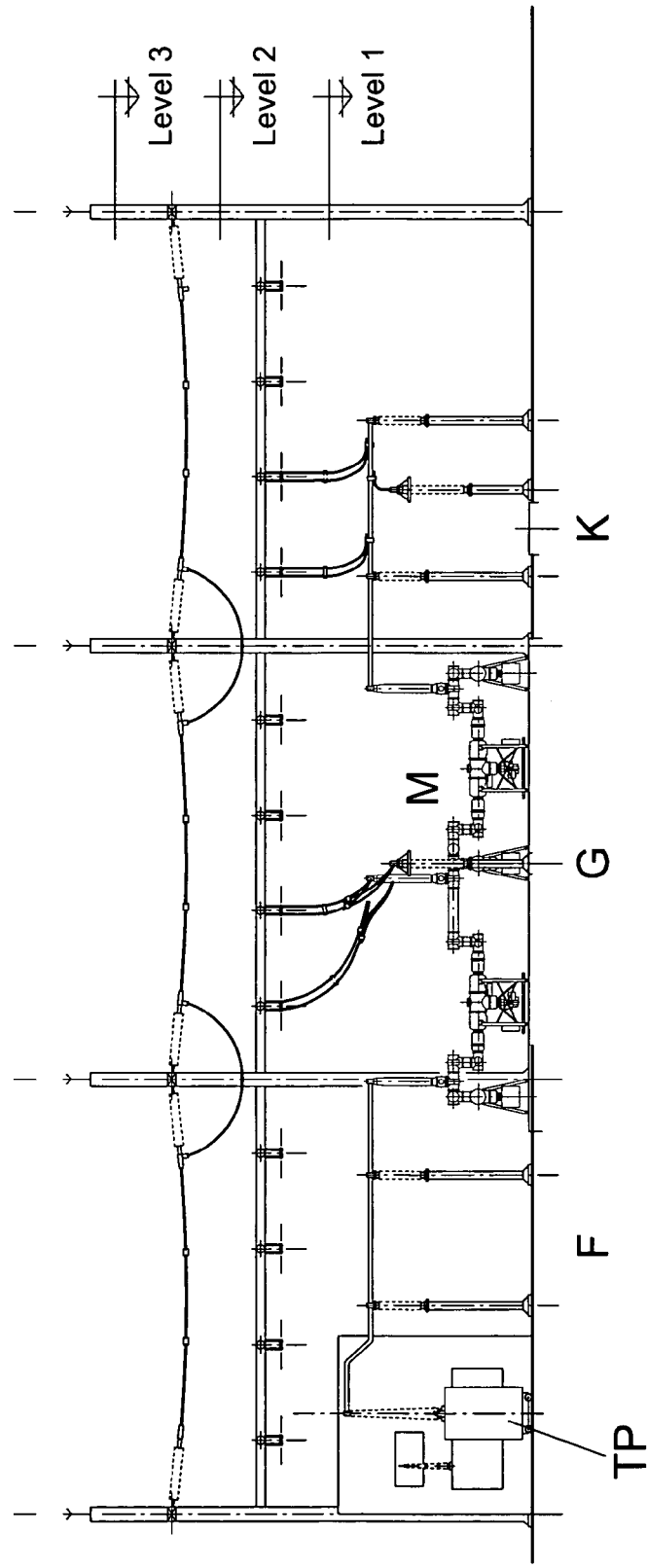
FIG. 19. Shows a raised ground schematic view of that represented in the previous figure.

Obviously, the aforementioned base elements F, G and K can be exactly equal and allow extensions on both sides, or some are ready for only allowing one lateral output, condemning that side to, as occurs with that shown in FIGS. 18 and 19 with base element F, or being seen as allowing for any kind of enlargement, on the other hand, as occurs with the K module on the right hand side, although the base elements are standard in all cases and only vary in the type of connection, offering the possibility of being implemented in the same manner on foundations already existing on the terrain.

Figure 20:
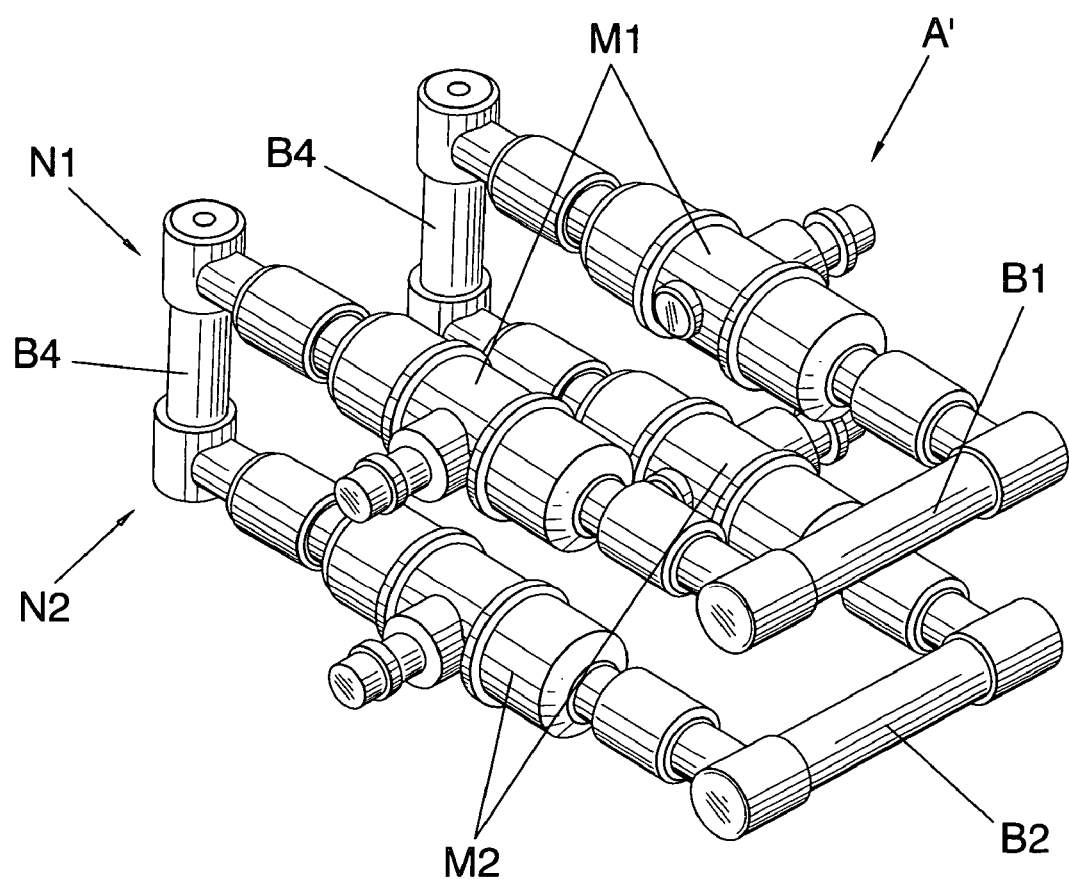
FIG. 20. Shows a physical representation according to the general perspective of a compact ring on two levels, in accordance with an alternative of the execution corresponding to an improvement in the invention.
Figure 21:
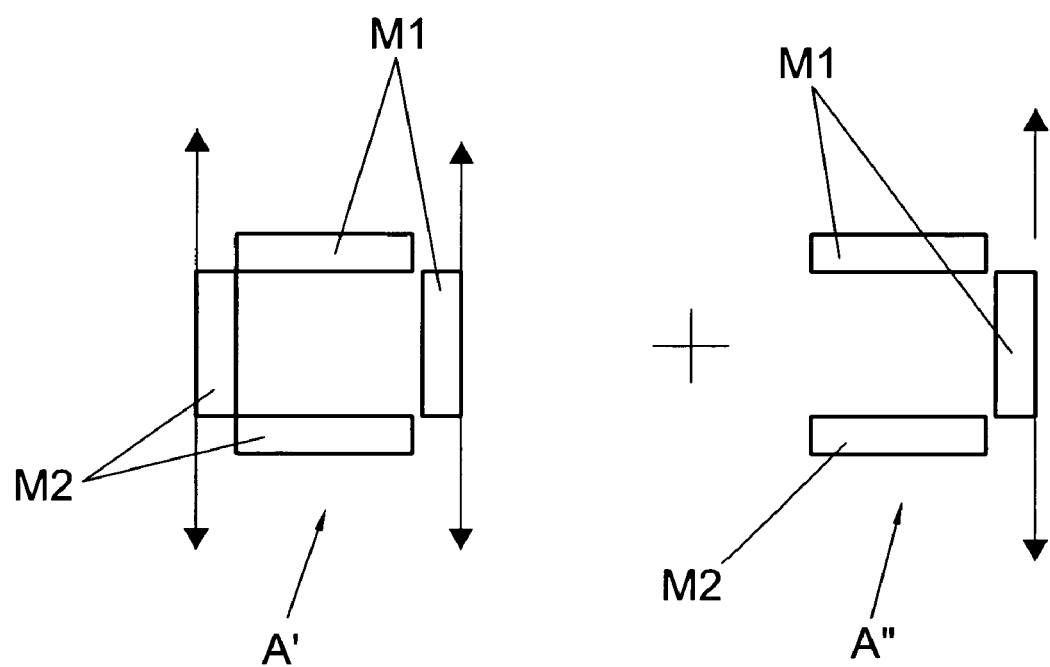
FIG. 21. Shows a schematic representation of the way in which to carry out the enlargement of an installation by means of adding successive compact rings with only three modules.
Figure 22:
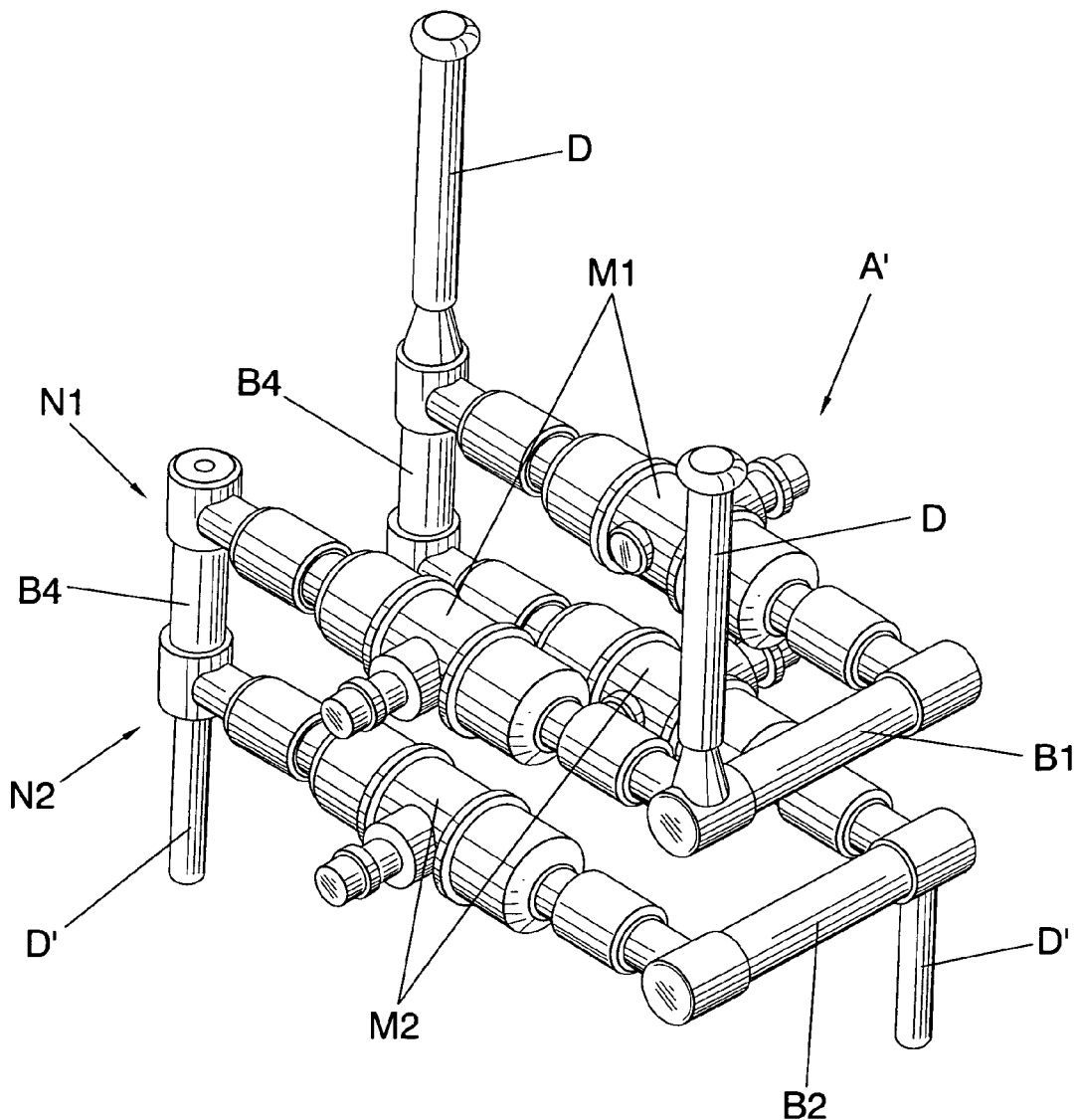
FIG. 22. Shows a view in perspective such as that of FIG. 20, with the layout of upper outputs by bushing (6) and lower ones by cable (7).

In the execution alternative shown in FIGS. 20, 21 and 22 an A' compact ring with levels N1 and N2 can be seen, where one of the ends, both of the M1 armoured modules at level N1 and of the M2 armoured modules at level N2, are joined by means of a B1 bar in the first case and by means of a B2 bar in the second case, while at the other end of these armoured modules M1 and M2 the join is made by means of B4 bar that joins the end of armoured module M1 at level N1 with the respective armoured module M2 at level N2, forming in this way the ring in which armoured modules M1 and M2 make up, as mentioned above, a circuit breaker, two voltage measurement transformers, two insulation disconnectors and two grounding disconnectors.

The A' compact ring referred to forms a block or modular set with four inputs/outputs, allowing the successive growth of a substation by means of adding similar and modular sets. Specifically, FIG. 21 shows a ring or set A' determined according to the physical configuration of FIG. 20, to which a second ring or set A" is added, without one of the M2 armoured modules, and where four inputs/outputs are seen for the A' set or ring and two inputs/outputs for the A" set, giving six inputs/outputs as the result of the sum.

FIG. 22 shows the ring or set represented in FIG. 20 with an arrangement of D upper outputs by bushing and D' lower outputs by cable, all this as an example since the arrangement of the outputs can be varied according to needs and availability of space, that is to say, with phases segregated at the same level or at different ones.

The invention claimed is:

1. An ELECTRICITY SUBSTATION, comprising
    an electric configuration having interconnections that comprise the electrical substation, selected from the group consisting of circuit breakers, disconnectors, intensity measurement transformers, voltage measurement transformers, electric bars and combinations thereof;
    an electric insulation technology selected from the group consisting of
        outdoor insulation using air as dielectric insulator, and
        elements encapsulated within armoured modules in an insulating environment selected from SF6 (sulphur hexafluoride) and other insulators; and
    a physical layout of electric phases;
    wherein said electrical substation is characterised by
        an electric layout implemented by means of single-phase armoured modules M, forming longitudinally-linked electrical squares, respective input/output positions L projecting from each of said electrical squares; each of the armoured modules M comprising a circuit breaker I, two intensity measurement transformers TI, two disconnectors S and two grounding disconnectors S';
        the electric insulation technology comprising independent and insulated chambers by means of said insulating environment, for elements selected from the circuit breaker I, the intensity measurement transformers TI, the disconnectors S and the grounding disconnectors S'; and
        the physical layout of the electrical phases being implemented in a manner selected from: by position and segregated, enabling a connection of converging input/output positions L, regardless of its layout in case the input/ output positions L are lines, avoiding crossing of lines and surrounding routes, also enabling a physical layout of the armoured modules M to be selected from ring, line and combination of ring and line.

2. An ELECTRICITY SUBSTATION, according to claim 1, wherein the armoured modules M are interconnected by means of a bare aluminium cable or tube, and/or by means of a SF6 insulated armoured conduit.

3. An ELECTRICITY SUBSTATION, according to claim 1, wherein the "ring" layout is able to be closed by means of a conductor C which joins the longitudinal ends corresponding to the arrangement of the armoured modules M that are interconnected to each other.

4. An ELECTRICITY SUBSTATION, according to claim 1, wherein in each input/output position L of the rings A, three measurement voltage transformers TT are included, one connected to the associated vertex of the respective ring A, and the other two, connected after the output disconnector S' which is established in the input/output position L.

5. An ELECTRICITY SUBSTATION, according to claim 1, wherein the "ring" configuration is enabled to form an enlargement of a conventional configuration, by means of connecting it to said conventional configuration, determining mixed configurations.

6. An ELECTRICITY SUBSTATION, according to claim 1, wherein the implementation of phases Ø0, Ø4, Ø8 in a segregated manner is accomplished by means of an external installation, by means of a layout of the conductors corresponding to the phases, at one or two height levels, while the rings A comprised by armoured modules M are arranged at a lower level and independently connected to phases Ø0, Ø4, Ø8, the three phases of each connection level being defined by four conductors X, Y, Z, where each conductor is comprised by several sections susceptible to connected to each other by means of bridges P in order to establish electric continuity in each conductor or phase, and in order to establish the interconnection of the different inputs/outputs at the nodes V and V' of the most convenient rings A, independently of the topology of the arrival of the inputs/outputs at the substation, two of these conductors corresponding only to both phases, which are completed by means of an insulated section belonging to the other two conductors corresponding to the third phase.

7. An ELECTRICITY SUBSTATION, according to claim 6, wherein, in the implementation of phases Ø0, Ø4, Ø8 in a segregated manner, two of the conductors (X and Y, for example) correspond to either phases Ø0 and Ø8, said phases being completed by means of an insulated section X' and Y' belonging to the other two conductors Z which determine the third phase Ø4.

8. An ELECTRICITY SUBSTATION, according to claim 1, wherein, with modules connected by means of insulation in SF6, the implementation is accomplished by means of an indoors facility with the layout of the different armoured modules M of the rings, in a building E with one or more floors in height.

9. An ELECTRICITY SUBSTATION, according to claim 1 comprising standard base elements F, G, K.

10. An ELECTRICITY SUBSTATION, according to claim 9, wherein the composition of the electrical substation is implemented by means of the standard base elements F, G, K, independently or in partial or total groups of said elements.

11. An ELECTRICITY SUBSTATION, according to claim 9, wherein the standard base elements F, G, K include connections for connection with each other, or for permitting lateral outputs to be established or an enlargement of the substation.

12. An ELECTRICITY SUBSTATION, according to claim 9, wherein the standard base elements G include the corresponding armoured modules M with appropriate connections for connecting with other same standard base elements or with base standard elements F and K for lateral outputs or for enlargements.

13. An ELECTRICITY SUBSTATION, according to claim 1, wherein the connections between transport lines and the substation are indistinctly accomplished by means of an overhead conductor, insulated cable, armoured conduits with SF6 and combinations thereof.

14. An ELECTRICITY SUBSTATION, according to claim 1, wherein the ring A' is a compact ring comprising two pairs of armoured modules M1 and M2, according to a layout at two levels N1 and N2, provided with the three phases segregated at the same level or at different levels, enabling the development of high voltage substations, being of particular interest for 400 kV and higher voltages.

15. An ELECTRICITY SUBSTATION, according to claim 14, wherein modules M1 and M2 of each level N1 and N2 are joined to each other at one of their ends by means of a bar B1 and B2, respectively, while at the other end the module of each level N1 is joined to that of the other level N2, by means of a vertical bar B4, determining the corresponding ring electric layout.

16. An ELECTRICITY SUBSTATION, according to claim 14, wherein compact ring A' is modular at two levels N1 and N2, determining a set or ring with four inputs/outputs, enabling the addition of other set or sets of rings A" provided with the same characteristics, in order to achieve an enlargement of the substation, each additional set A" comprising three armoured modules and two inputs/outputs, the remaining armoured module being implemented by means of a simple connection.

* * * * *